United States Patent [19]
Imura et al.

[11] 3,777,636
[45] Dec. 11, 1973

[54] ELECTRONIC SHUTTER IN CAMERA
[75] Inventors: Toshinori Imura, Sakai; Yoshifusa Fujii, Mori, both of Japan
[73] Assignee: Minolta Camera Kabushiki Kaisha, Minamiku, Osaka, Japan
[22] Filed: June 24, 1971
[21] Appl. No.: 156,251

[30] Foreign Application Priority Data
June 30, 1970 Japan.............................. 45/57651
June 30, 1970 Japan.............................. 45/57652

[52] U.S. Cl. ............. 95/10 CT, 95/53 E, 95/53 EA
[51] Int. Cl. ............................................. G03b 7/08
[58] Field of Search ........... 95/10 CT, 53 E, 53 EA, 95/53.3

[56] References Cited
UNITED STATES PATENTS
3,626,826  12/1971  Putscher........................... 95/53 EA
3,646,869  3/1972  Arai................................... 96/53 EA
3,511,143  5/1970  Rentschler........................ 95/53 E FOREIGN PATENTS OR APPLICATIONS
1,095,843  12/1967  Great Britain.................... 95/10 CT Primary Examiner—Samuel S. Matthews
Assistant Examiner—Russell E. Adams, Jr.
Attorney—Stanley Wolder

[57] ABSTRACT

The device includes an electromagnet and an arresting member for a sector driving member and a closing effecting member. The electromagnet is energized by closing the switch of an exposure time control circuit to release the shutter and deenergized under the control of the exposure time control circuit. When attracted upon energization of the electromagnet, the arresting member permits the sector driving member to move in the shutter opening direction, and when the electromagnet is deenergized, the arresting member returns under the action of a restoring spring and initiates the closing effecting member into movement in the shutter closing direction. Thus the initiation of opening and closing of the shutter is controlled by the above-mentioned only one electromagnet.

6 Claims, 10 Drawing Figures

Inventor
TOSHINORI IMURA
YOSHIFUSA FUJII
By
Stanley Weller
Attorney

Inventor
TOSHINORI IMURA
YOSHIFUSA FUJII
By Stanley Wolder
Attorney 3,777,636

ELECTRONIC SHUTTER IN CAMERA

BACKGROUND OF THE INVENTION

The present invention relates to an electronic shutter in camera incorporating an electromagnet for controlling exposure time.

With electronic shutters of this type, the electromagnet performs only the control of exposure time and the shutter is released mechanically. In the case where shutter release is effected mechanically, the release mechanism not only becomes complex but also requires a relatively large stroke in operation, impairing smooth and easy shutter release operation.

A mechanism is further known wherein both control of exposure time and shutter release are performed by electromagnet. With such mechanism, control of exposure time and shutter release operation are effected by separate electromagnets respectively, and there is a need to incorporate two electromagnets in the shutter mechanism of the camera. Accordingly, the mechanism requires a larger space, making it impossible to build a compact shutter, and results in cost increase. Thus, it has therefore been difficult to provide a compact camera equipped with an electronic shutter.

In taking photographs with a long exposure time, camera shake has to be avoided until completion of an exposure. However, since cameras generally used are not equipped with means for indicating completion of an exposure, completion of an exposure has to be judged solely by detecting the sound of a shutter operation. Accordingly, the operator must be very attentive when he takes a photograph, while in very noisy places it becomes difficult to detect the sound of a shutter operation. Further when the shutter is to be released by remote control or by a self-timer, completion of an exposure may possibly be detected by looking at the movement of the sectors, but on such occasion it is nearly impossible to hear the sound of a shutter operation, so that an inconvenience is experienced and misjudgement frequently results in a failure in taking a photograph.

It is also known to provide a mechanically operated indication so as to notify completion of an exposure. Since such device utilizes the action of a self-timer, the pertinent mechanism is complex and the device per se is useless unless a photograph is taken by using the self-timer.

To sum up, if it becomes possible to notify completion of an exposure in readily detectable manner, the operability of the camera will then be remarkably improved.

SUMMARY OF THE INVENTION

An object of this invention is to enable only one electromagnet to control initiation of both shutter opening and closing operations so as to provide an electronic shutter which is simple in construction and can be installed in a smaller space and thereby provide a compact camera at a low cost.

Another object of this invention is to provide a device in a camera equipped with an electronic shutter of the type described which device is capable of electrically indicating completion of an exposure upon detecting the movement of a member for driving sectors at least in the opening or closing direction or the movement of a member operatively associated with these members.

The electromagnet in accordance with this invention is coupled with an electric circuit for controlling exposure time which is closed by a shutter release operation. The electric circuit is opened and closed as desired by depression of a release button or push button switch for shutter release. Closing of the circuit energizes a delay circuit comprising a combination of photocell and capacitor so as to control exposure time in corresponding relation to the brightness of the subject. It is also known that the electric circuit is so constructed that the electromagnet is energized upon closing of the circuit and deenergized immediately when the capacitor of the delay circuit is charged up to a given voltage.

In accordance with this invention there is provided an arresting member for latching a member for driving sectors in the shutter opening direction and to be attracted by the electromagnet upon energization of the magnet to release the sector driving member and thereby initiate the same into movement while at the same time latching a closing effecting member for driving the sectors in the shutter closing direction, the arresting member further being adapted to release the closing effecting member and thereby initiate the same into movement upon deenergization of the electromagnet. Thus the electromagnet operates the arresting member upon energization and deenergization to thereby initiate the sector driving member and closing effecting member in sequence for the control of opening and closing of the shutter.

In order to notify completion of an exposure, there is provided a switch for turning on a lamp upon detecting the movement of the sector driving member o closing effecting member or some other member operatively associated with opening and closing of the shutter. The lamp is disposed at a suitable portion of the camera so that the operator can detect the lighting of the lamp in the finder field or on the exterior of the camera. The switch is so disposed that it turns on the lamp upon sensing completion of an exposure or exposure being effected by detecting the movement of any one of the above-mentioned operating members.

Other objects and characteristics of this invention will become more apparent from the following description.

DESCRIPTION OF THE PREFERRED EMBODIMENTS

Figure 1:
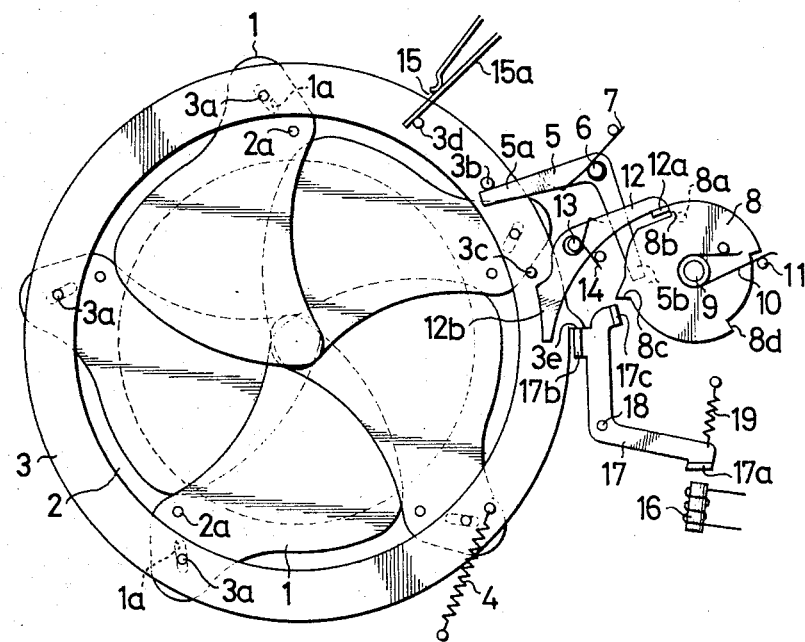
FIG. 1 is a front view showing the construction of principal section of an electronic shutter embodying the present invention.
Figure 2:
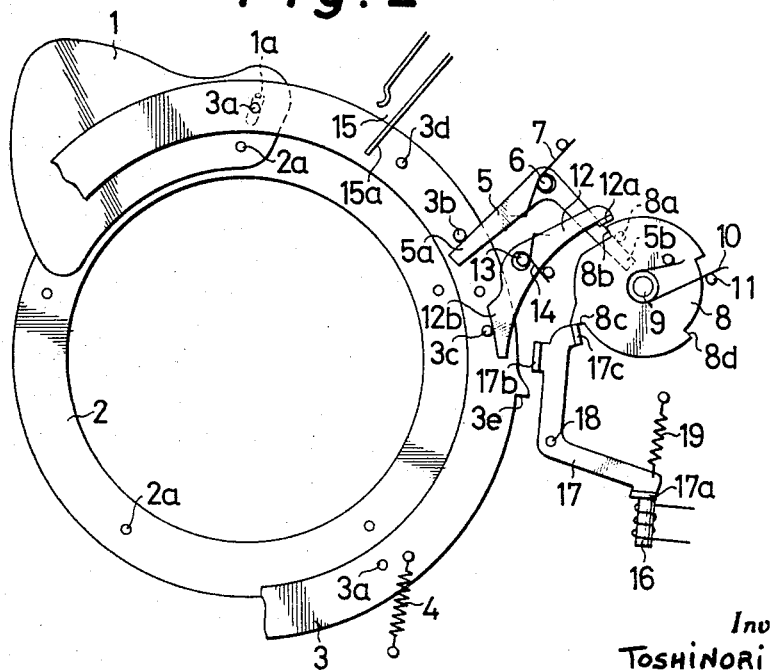
FIGS. 2 and 3 are front views of principal section of the embodiment in FIG. 1, the views showing the operation of the parts in sequence.
Figure 3:
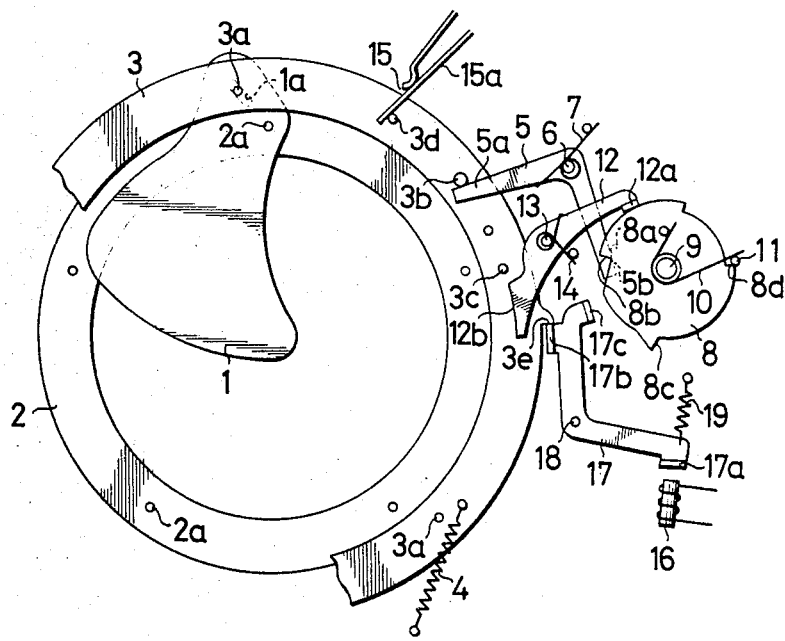

Referring to FIGS. 1 to 3, each sector 1 is pivoted at 2a on a fixed ring 2, with a slot 1a in engagement with a pin 3a extending from the rear face of a sector driving member 3. When the sector driving member 3 is moved in a clockwise direction as seen in the drawing under the action of a spring 4, the shutter is opened as shown in FIG. 2, while when the sector driving member 3 is moved in a counterclockwise direction against the action of the spring 4, the shutter is closed as illustrated in FIG. 3.

The sector driving member 3 is provided with pins 3b, 3c and 3d, and a projection 3e is formed at a suitable portion on the outer periphery of the sector driving member 3. In FIGS. 2 and 3 some sectors are omitted.

A closing lever 5, mounted on a pivot 6 is urged in a clockwise direction in the drawing by a spring 7, with its end 5a always in engagement with the pin 3b on the sector driving member 3. The tail end 5b of the closing lever 5 is positioned in the circular path of a pin 8a mounted on the rear face of a closing effecting member 8.

The closing effecting member 8 is pivoted at 9 and urged in a counterclockwise direction in the drawing by a spring 10. Upon completion of closing of the shutter, the closing effecting member 8 is so positioned as illustrated in FIG. 3, and in operative relation to the tensioning of the shutter, it is driven clockwise to the position illustrated in FIG. 1 to compress the spring 10. In addition to the pin 8a, the closing effecting member 8 is further formed, in its outer periphery, with a cutout 8b, a projection 8c and a stepped portion 8d for a stopper 11.

A lever 12 is mounted on a pivot 13 and urged in a clockwise direction under the action of a spring 14. A lug 12a at the end of the lever 12 is in contact with the outer periphery of the closing effecting member 8 and is brought into engagement with the cutout 8b in the closing member 8 upon shutter tensioning to prevent the counterclockwise rotation of the closing effecting member 8 due to the action of the spring 10. The tail portion 12b of the lever 12 is positioned in the path of the pin 3c on the sector driving member 3, so that when the sector driving member 3 is rotated in a clockwise direction, the pin 3c kicks up the tail portion 12b to disengage the lever 12 from the closing effecting member 8.

Figure 4:
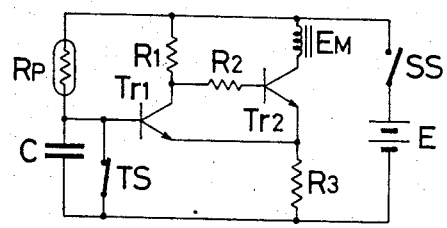
FIG. 4 is a diagram showing an electric circuit for controlling exposure time.

Indicated at 15 is a trigger switch included in the electric circuit for controlling exposure time shown in FIG. 4. The distal end of actuating member 15a of the switch is in engagement with the pin 3d on the sector driving member 3 to form a usually closed contact, which is opened as shown in FIG. 2 when the sector driving member 3 moves in the shutter opening direction. The exposure time control electric circuit is connected to an electromagnet 16. Closing of the circuit energizes the electromagnet 16 and when the charge on a capacitor in the delay circuit reaches a predetermined voltage, the electromagnet 16 is deenergized.

An arresting member 17 supported on a pivot 18 is urged in a counterclockwise direction in the drawing by a spring 19. The arresting member 17 is provided at its tail end with a lug 17a facing the electromagnet 16. Another lug 17b at the side of front end of the arresting member 17 is adapted for engagement with the projection 3e on the outer periphery of the sector driving member 3 to prevent the clockwise rotation of the sector driving member 3 due to the action of the spring 4 when the shutter is closed.

Formed at the front end of the arresting member 17 is another lug 17c which is brought into engagement with the projection 8c on the outer periphery of the closing effecting member 8 to block the rotation of the member 8 when the lug 17a is attracted to the electromagnet 16. Thus the electromagnet 16 when energized swings the arresting member 17 in a clockwise direction against a spring 19 to permit the sector driving member 3 to move in the shutter opening direction. At the same time, the member 17 prevents the closing effecting member 8 from rotation. When the electromagnet 16 is deenergized, the arresting member 17 returns in a counterclockwise direction to initiate the closing effecting member 8 into counterclockwise rotation.

When the arresting member 3 is moved in a clockwise direction by the spring 14, the pins 3a move the sectors 1 in a clockwise direction about the pivots 2a to open the shutter. At this time the pin 3b pushes the closing lever 5 and moves the same in a counterclockwise direction, while the pin 3c kicks up the tail portion 12b of the lever 12 and disengages the lug 12a from the closing effecting member 8. The pin 3d opens the trigger switch 15. On the other hand, the closing effecting member 8 thus freed from the engagement moves in a counterclockwise direction under the action of the spring 10, permitting the projection 8c to come into contact with the lug 17c of the arresting member 17, and is brought to a halt. As a result, the energization of the electromagnet 16 brings the respective parts to the position shown in FIG. 2.

When the electromagnet 16 is deenergized under the action of the exposure time control electric circuit, the arresting member 17 is returned in a counterclockwise direction by the force of the spring 19, with the lug 17c disengaged from the projection 8c of the closing effecting member 8. The member 8 therefore moves counterclockwise under the action of the spring 10, causing the pin 8a to push the tail portion 5b of the closing lever 5 to move the lever 5 in a clockwise direction, with the front end 5a of the lever 5 in pushing engagement with the pin 3b on the sector driving member 3. Due to this movement, the driving member 3 rotates in a counterclockwise direction while tensioning the spring 4, with the result that the sectors 1 are driven in a counterclockwise direction about the pivots 2a to close the shutter. The closing of the shutter allows the pin 3d to close the trigger switch 15 and the lug 17b on the arresting member 17 to engage the projection 3e on the sector driving member 3, whereby the driving member 3 is latched against clockwise rotation. Since the pin 3c is freed from engagement with the tail portion 12b of the lever 12, the lug 12a at the front end of the lever 12 comes into sliding contact with the outer periphery of the closing effecting member 8. The closing effecting member 8 comes to a halt when the stepped portion 8d thereof abuts the stopper 11. Thus the parts are brought to the position shown in FIG. 3.

Upon subsequent shutter release, the closing effecting member 8 is driven in a clockwise direction and the lug 12a at the front end of the lever 12 engages the cutout 8b as already described.

The exposure time controlling electric circuit for energizing and deenergizing the electromagnet has a structure as shown in FIG. 4. Referring to this drawing, indicated at $E_M$ in a winding for energizing the electromagnet; at TS, a trigger switch; at $R_P$, a photosemiconductor such as photocell or a variable resistor which forms a delay circuit along with a capacitor C; at $Tr_1$, $Tr_2$, transistors; at $R_1$, $R_2$, $R_3$, fixed resistors; and at E, a power source.

When the start switch SS is closed, current passes through the winding $E_M$ to energize the electromagnet. At the same time, the sector driving member opens the trigger switch TS and charging on the capacitor C is initiated through the photocell $R_P$ in the delay circuit. Since the resistance value of the photocell $R_P$ varies with the brightness of the subject, the period of charging on the capacitor C corresponds to the brightness of the subject. When the charge on the capacitor C reaches a predetermined voltage. , the operation of the transistors $Tr_1$ and $Tr_2$ is reversed to stop the curent supply to the winding and deenergize the electromagnet. The start switch SS is opened by unillustrated means the moment the shutter is closed.

It will be apparent from the above description that the period of energization of the electromagnet 16 is controlled by the exposure time control electric circuit. Further the control circuit may have any other construction insofar as it fulfils the object of this invention. Further it will be apparent that the start switch can be associated with shutter release. It is also easy to provide the shutter release member in the form of a push button, or to provide shutter release means adapted for remote control.

Figure 5:
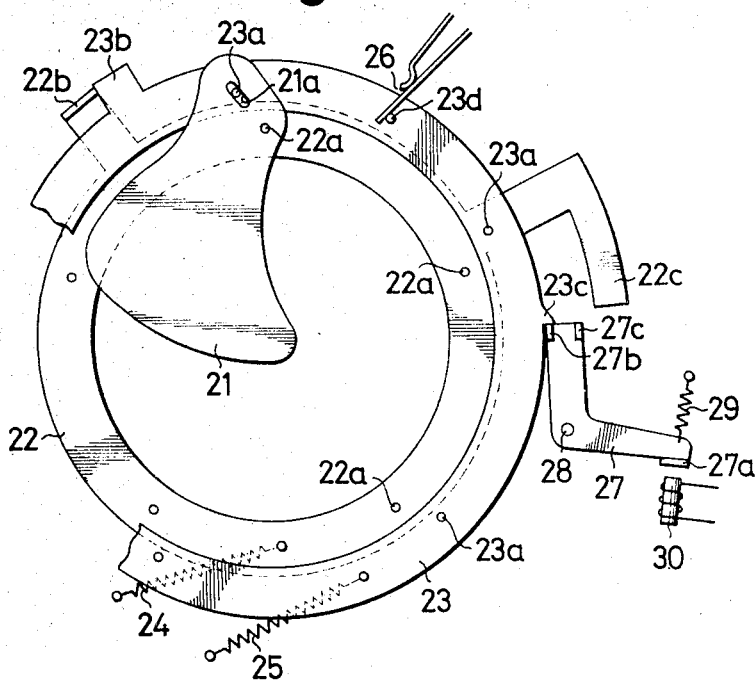
FIG. 5 is a front view showing the construction of principal section of a modified embodiment in accordance with the present invention.
Figure 6:
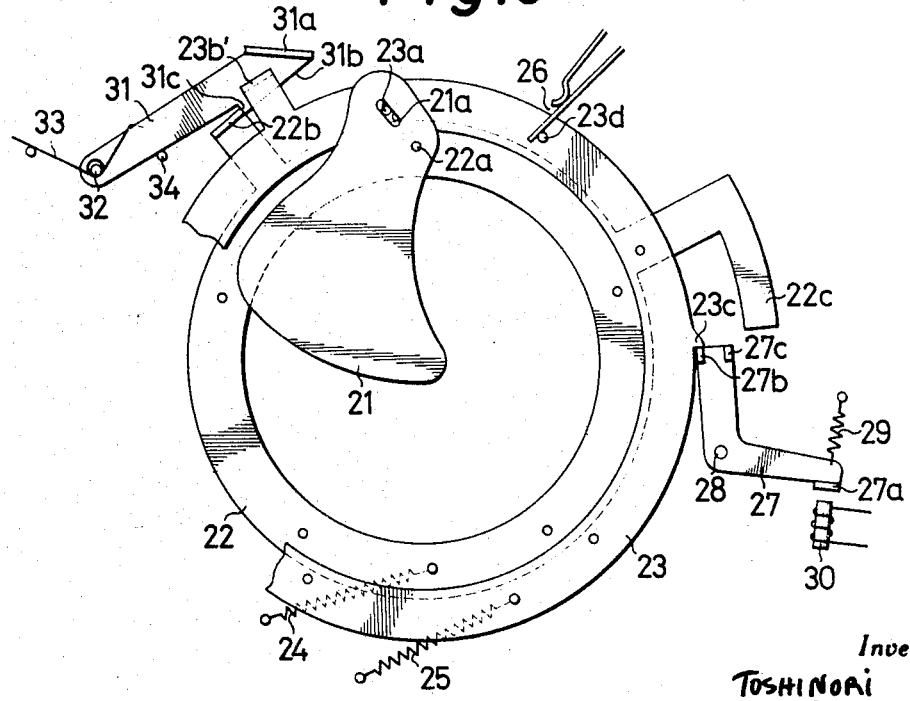
FIG. 6 is a front view showing another modified embodiment of this invention.

FIGS. 5 and 6 show embodiments including a closing effecting member constructed in an annular form and disposed concentrically with the sector driving member. With these embodiments the closing effecting member is rotated in the same direction as the sector driving member to close the shutter after the shutter has been opened by the clockwise movement of the sector driving member, without a need to rotate the sector driving member in the reverse direction. As in the foregoing embodiment shown in FIGS. 2 and 3, some sectors are not shown.

Referring to FIG. 5, a sector 21 is pivoted at 22a on an annular closing effecting member 22, and a pin 23a on a sector driving member 23 is engaged in a slot 21a in the sector 21.

The closing effecting member 22 is urged in a clockwise direction in the drawing by a spring 24, and the sector driving member 23 is also urged in a clockwise direction in the drawing by a spring 25. The sector driving member 23 is formed with projections 23b and 23c on its outer periphery and has a pin 23d for opening a trigger switch 26 simultaneously with opening of the shutter. The closing effecting member 22 is provided on its outer periphery with a bent projection 22b and an arm 22which is bent in the form of a hook.

An arresting member 27 mounted on a pivot 28 is urged in a counterclockwise direction by a spring 29, with a lug 27a at its tail end facing an electromagnet 30. The arresting member 27 further includes a lug 27b at its front end which comes into engagement with the projection 23c of the sector driving member 23 upon shutter tensioning so as to prevent the clockwise rotation of the sector driving member 23 due to the action of the spring 25. The arresting member 27 further includes another lug 27c at its front end which engages the distal end of the hooklike arm 22c of the closing effecting member 22 when the lug 27a is attracted by the electromagnet 30, whereby the member 22 is prevented from rotation against the action of the spring 24.

During a shutter tensioning operation, the sector driving member 23 is rotated in a counterclockwise direction by unillustrated means to tension the spring 25, and, at the same time, the projection 23b on its outer periphery comes into contact with the lug of the bent projection 22b of the closing member 22 and turns this member 22 in a counterclockwise direction, whereby the spring 24 is tensioned. When the shutter has completely been tensioned, the parts are brought to the position shown in FIG. 5. The engagement of the lug 27b of the arresting member 27 with the projection 23c on the sector driving member 23 retains the shutter in cocked position.

The electromagnet 30 when energized attracts the lug 27a at the tail end of the arresting member 27 to turn the member 27 clockwise against the spring 29 and thereby free the projection 23c. The sector driving member 23 therefore starts to move in a clockwise direction. At the same time, the displacement of the pin 23d opens the trigger switch 26. On the other hand, since the lug 27c comes into contact with the end of hooklike arm 22c of the closing effecting member 22 to block the rotation of the closing effecting member 22, the sector driving member 23 alone is allowed to move clockwise under the action of the spring 25, with the result that the sector 21 is driven in a clockwise direction about the pivot 22a to open the shutter.

When the exposure time control circuit functions to deenergize the electromagnet 30, the spring 29 moves the arresting member 27 in a counterclockwise direction to release the hooklike arm 22c and permits the closing effecting member 22 to turn clockwise. The resulting displacement of the pivot 22a turns the sector 21 in a counterclockwise direction and closes the shutter. The subsequent shutter tensioning action further brings the parts back to the position of FIG. 5 as already described.

FIG. 6 shows an embodiment wherein a lever 31 having an effect equivalent to that of the lever 12 in the embodiment of FIGS. 1 to 3 is attached to the embodiment of FIG. 5.

The lever 31 is pivoted at 32 and urged in a clockwise direction, the position of the lever 31 being determined by a stopper 34. The lever 31 is formed with an oblique lug 31a at its distal end, a slanting side 31b, and a stepped portion 31c where the slanting side 31b terminates. When the shutter is in cocked position, the stepped portion 31c is in engagement with the bent projection 22b of the closing effecting member 22 to lock the member 22 against clockwise rotation.

When the electromagnet 30 is energized in this embodiment, the arresting member 27 is moved in a clockwise direction, and the sector driving member 23 starts to move in a clockwise direction, causing the projection 23b' to come into contact with the oblique lug 31a of the lever 31, whereby the lever 31 is moved in a counterclockwise direction to release the closing effecting member 22 from the stepped portion 31c. As a result, the closing effecting member 22 moves a small distance in a clockwise direction until it comes to a halt when the distal end of the hooklike arm 22c contacts the lug 27c on the arresting member 27. Thus the lever 31 serves to slightly delay the timing for the distal end of the hooklike arm 22c to contact the lug 27c so as to ensure the contact. The opening and closing of the shutter will be subsequently effected in exactly the same manner as in FIG. 5.

In tensioning the shutter, the sector driving member 23 is driven in a counterclockwise direction by unillustrated tensioning means. During this movement, the projection 23b' pushes the bent projection 22b of the closing effecting member 22 to turn the member 22 in a counterclockwise direction together with the sector driving member 23. The bent projection 22b, when returned to the position of the distal end of the lever 31, pushes up the slanting side 31b of the lever 31, permitting the projection 23b' to pass under the oblique lug 31a. When the stepped portion 31c is forced into engagement with the bent projection 22b by the spring 33, the parts are returned to the state of FIG. 6.

In the foregoing embodiments, the closing effecting members 8, 22 are adapted to follow the movement of the sector driving members 3, 23 for a very short period after the sector driving members 3, 23 are initiated into shutter opening operation upon the arresting members 17, 27 being attracted by the electromagnets 16, 30 until the arresting members 17, 27 prevent clockwise rotation of the closing effecting members 8, 22. Such construction serves to compensate for the mechanical delay of the parts relative to the time measurement of the electric circuit during high speed operation of the shutter. In place of providing a mechanism whereby the arresting members 17, 27 are directly engaged with or disengaged from the sector driving member and closing member, a gear mechanism may be employed to effect such engagement at a position where the movement has been accelerated, this ensuring operation with a smaller force.

FIGS. 7 to 10 show several embodiments of a device to be incorporated in camera equipped with the foregoing electronic shutter for indicating, in operative relation to the action of the shutter, completion of an exposure or an exposure which is being made. Each of these figures show only a principal section and the parts similar to those in FIGS. 1 to 3 are referred to by like numerals.

Figure 7:
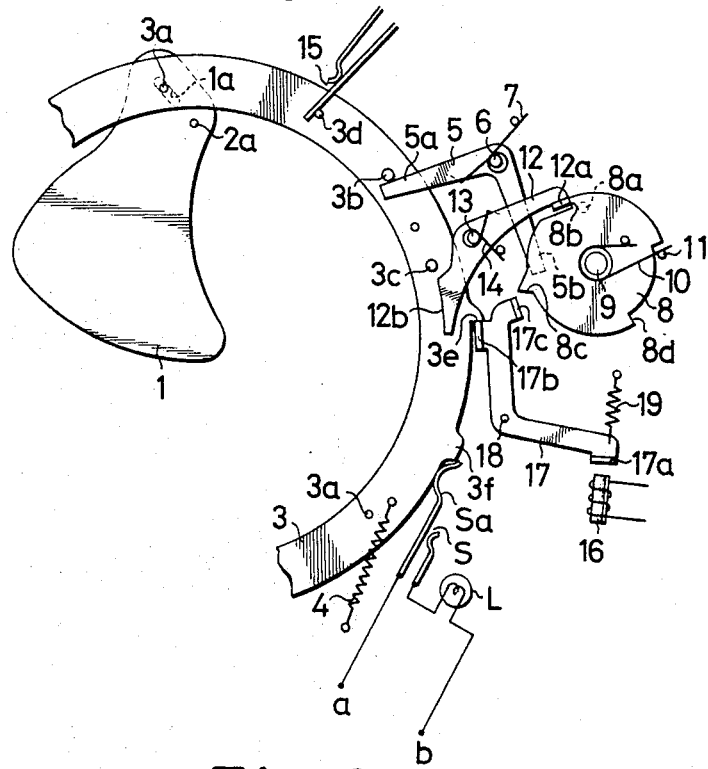
FIG. 7 is a front view of an embodiment provided with means for indicating completion of an exposure.

FIG. 7 shows a mechanism for turning on and off a pilot lamp L upon detection of the movement of the sector driving member 3. The sector driving member 3 is formed on its outer periphery with a projection 3f in contact with which the actuating member of the switch S for the lamp L is disposed. Indicated at a and b are terminals for connecting the lamp to a power source. When the lug 17a of the arresting member 17 is attracted to the electromagnet 16 and the selector driving member 3 is initiated into clockwise movement, the projection 3f pushes the actuating member Sa to close the switch S and turn on the lamp L. When the projection 3f has passed by the Sa portion of the actuating member, the switch is opened to turn off the lamp L. Subsequently, the electromagnet 16 is deenergized by the action of the exposure time control electric circuit, permitting the spring 19 to turn the arresting lever 17 in a counterclockwise direction, whereupon the sector driving member 3 is returned in a counterclockwise direction. Just prior to completion of this return movement, the projection 3f pushes the actuating member Sa to close the switch S and turn on the lamp L. When the shutter has completely been closed, the projection 3f passes by the portion Sa to open the switch and turn off the lamp L. Thus the first lighting of the lamp indicates initiation of an exposure and the second lighting, completion of the exposure.

Figure 8:
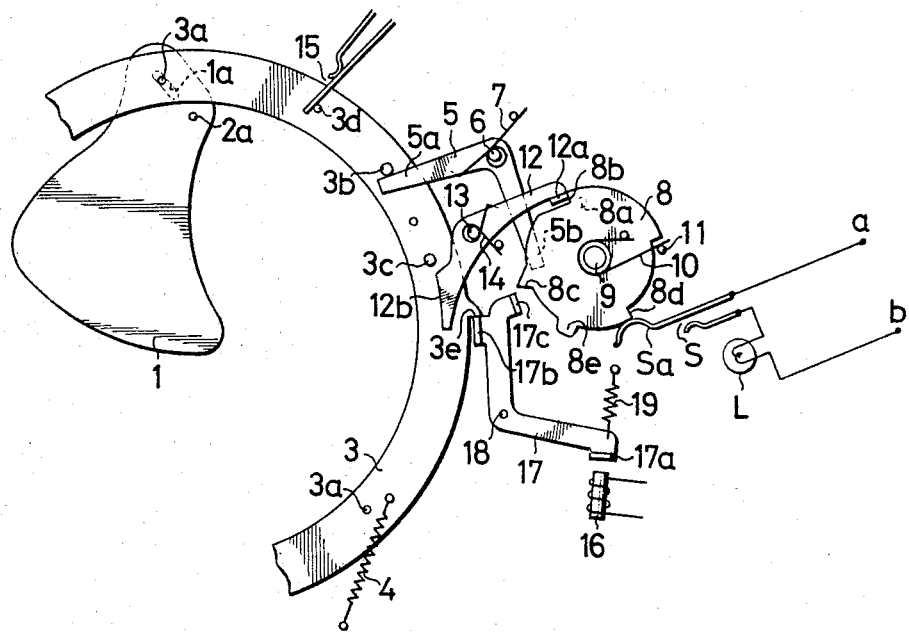
FIGS. 8 to 10 are front views showing embodiments provided with modified means for indicating completion of an exposure.

FIG. 8 illustrates a structure wherein the lamp L is turned on by the closing effecting member 8. In this case, the closing effecting member 8 is formed on it periphery with another projection 8e which is engageable with the actuating member Sa of a switch S. After the closing effecting member 8 has been initiated into rotation subsequent to opening of the shutter, the projection 8e pushes the actuating member Sa just before the completion of the rotation, i.e. just before the completion of an exposure, or at the moment of the completion of an exposure, whereby the switch is closed to turn on the lamp L and thereby indicate the termination of an exposure. Upon completion of rotation of the closing effecting member 8, the actuating member Sa passes over the projection 8e to open the switch and the lamp is turned off. Thus in accordance with this embodiment, only the completion of an exposure is indicated. The switch may be closed the moment when the shutter is initiated into tensioning to light the lamp, but such drawback can be easily eliminated by providing an unillustrated switch in the circuit of the lamp L for opening and closing the circuit in operative relation to the movement of the shutter release member.

Figure 9:
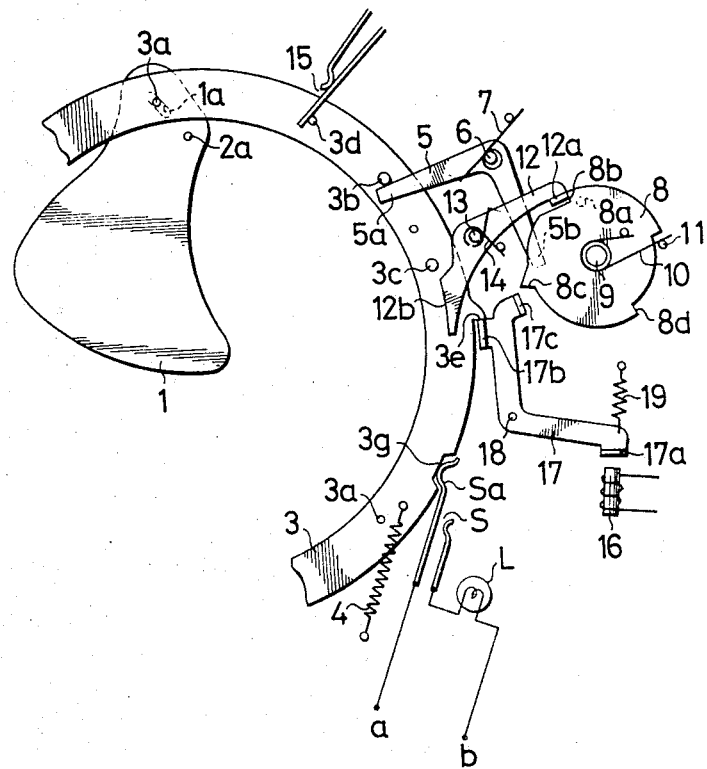

FIG. 9 shows an embodiment wherein the lamp L is lighted during exposure The sector driving member 3 is formed in its outer periphery with a recess 3g in which the actuating member Sa of a switch S is engaged when the shutter is in closed position. The sector driving member 3, when initiated into rotation, pushes the actuating member Sa out of the recess 3g into contact with the periphery of the member 3 to close the switch S and turn on the lamp L. When the sector driving member 3 is returned, upon completion of a predetermined exposure, to the position where it was initiated into movement, the actuating member Sa engages in the recess 3g to open the switch S and turns off the lamp L.

Figure 10:
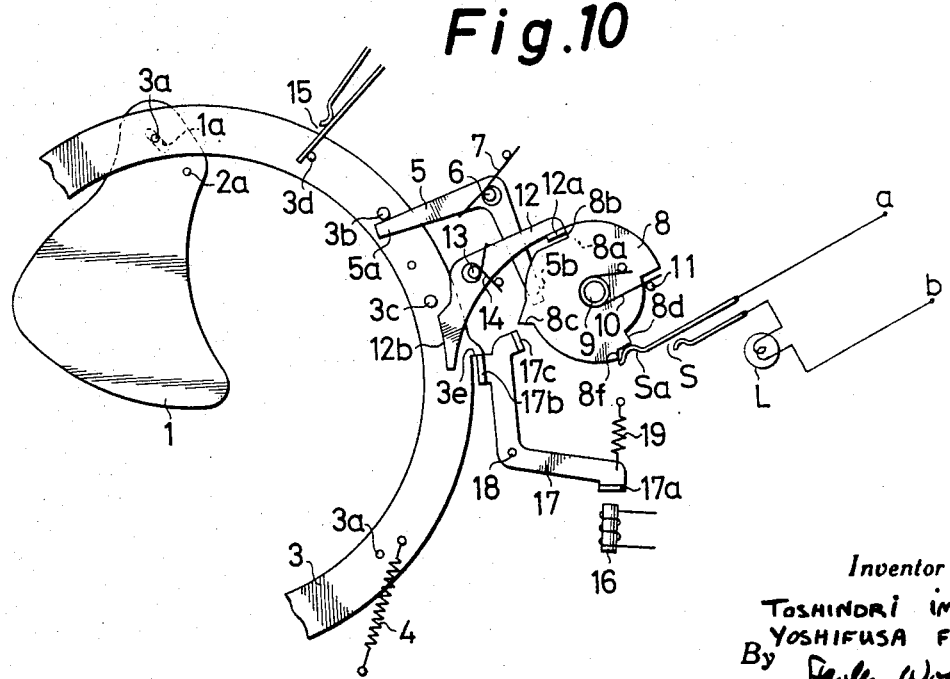

FIG. 10 shows a structure wherein the closing effecting member 8 is formed with a stepped portion 8f so as to turn on the lamp L during exposure as in the above embodiment. While the shutter is in cocked position, the actuating member Sa of switch S is retained at a low position in the stepped portion 8f. When the sector driving member 3 is initiated into movement, the closing effecting member 8 also moves counterclockwise a short distance until it is blocked by the arresting member 17, causing the actuating member Sa to ride on a high position of the stepped portion 8f to close the switch S and turn on the lamp L. The lamp keeps lighting while the closing effecting member 8 is in rotation after being initiated into rotation subsequent to completion of a shutter opening operation by the sector driving member 3. When the shutter is completely closed the lamp L may be turned off by a switch or the like associated therewith.

In each of the above embodiments, the lamp L may be disposed in a suitable position such that the photographer under any circumstances can observe the lighting of the lamp. It is further possible to provide a plurality of lamps as desired, for example, one in the finder and another on the exterior of the camera. Needless to say, the color and illuminance of the lamp are such that

What is claimed is:

1. A camera electronic shutter mechanism comprising shutter sectors;
   a rotatable shutter opening means urged to rotate in an advance direction from a cocked position to a released position to drive said shutter sectors to a shutter opened position and including a sector driving means for closing the shutter when at the cocked position and opening the shutter when at the released position;
   a rotatable shutter closing means urged to rotate from a cocked position to a released position to drive said shutter sectors to a shutter closed position and including a closing driving member for rotating said sector driving member from the released position to the cocked position in rotating of said closing driving member from the cocked position to the released position;
   a start switch closed in relation to shutter release;
   a timing circuit including a photocell responsive to the amount of light incident thereon;
   means including a trigger switch actuated in response to the actuation of said shutter opening means for triggering said timing circuit;
   an electromagnet;
   means including a switching circuit for energizing said electromagnet in response to the closing of said start switch and deenergizing said electromagnet an interval responsive to said timing circuit following the actuation of said trigger switch;
   a first arresting means for latching said shutter closing means in its cocked position and releasing said shutter closing means in relation to the actuation of said shutter opening means; and
   a second arresting means transferable between a first position latching said shutter opening means and a second position latching said shutter closing means, and normally urged to said first position to latch said shutter opening means in cocked position, said second arresting means being actuable by the energization of said electromagnet and moved from the first position to the second position to permit the advance of said shutter opening means, said first arresting means being responsive to the advance of said shutter opening means to move said first arresting means to its release position of said shutter closing means, with said second arresting means being in said second position latching said shutter closing means, said second arresting means being returnable to the first position upon deenergization of said electromagnet to release said shutter closing means.

2. The device as set forth in claim 1 wherein said electric shutter is equipped with means for indicating completion of an exposure, said means comprising a mechanical signal generator provided on a member for driving the sector at least in the shutter closing direction and a lamp to be lighted by said mechanical signal generator for indicating at least completion of an exposure.

3. The device as set forth in claim 2 wherein said mechanical signal generator comprises a projection formed on said member for driving the sectors at least in the shutter closing direction and a switch to be actuated by said projection to open and close the electric circuit of said lamp.

4. The device as set forth in claim 2 wherein said mechanical generator comprises a recess formed in said member for driving the sectors at least in the shutter closing direction and a switch having an actuating member to engage in said recess and to be pushed out of said recess by the movement of said member for driving the sectors so as to close the electric circuit of said lamp.

5. The electronic shutter device as set forth in claim 1 wherein said shutter closing means includes a rotatable closing effecting member, said closing effecting member transmitting the rotation motion of said closing driving member from the cocked position to the released position to said sector driving member.

6. An electronic shutter device in a camera comprising shutter sectors;
   a shutter opening means including a shutter ring for opening and closing the shutter by reciprocation between a first position closing said shutter sectors and a second position opening said shutter sectors, and means urging said shutter ring to move from the first position to the second position;
   a shutter closing means urged to rotate from a cocked to a released position for moving said shutter ring from the second position to the first position with the rotation of said shutter closing means from the cocked position to the released position;
   an electromagnet;
   an exposure time control circuit for controlling the energization and demagnetization of said electromagnet, said circuit including a start switch closed in relation to shutter release, a timing circuit including a photocell responsive to incident light, a trigger switch actuated in response to the actuation of said shutter opening means to trigger said timing circuit, and a switching circuit for energizing said electomagnet on the closing of said start switch and deenergizing said electromagnet an interval responsive to said timing circuit, following the actuation of said trigger switch;
   a first arresting means for latching said shutter closing means at the cocked position and releasing said shutter closing means in relation to the actuation of said shutter opening means; and
   a second arresting means movable between a first position latching said shutter opening means at its first position and freeing the rotation of said shutter closing means and a second position releasing the latching of said shutter opening means and latching the rotation of said shutter closing means and normally urged toward the first position;
   said second arresting means being actuated by the energizing of said electromagnet to move from the first position to the second position to actuate said shutter opening means;
   said shutter closing means being released by said first arresting means in relation to the actuation of said shutter opening means and being latched by said second arresting means positioned at the second position; and
   said second arresting means being urged to return to the first position by the deenergization of said electromagnet to release said shutter closing means.

* * * * *